United States Patent [19]
Spencer

[11] 3,779,468
[45] Dec. 18, 1973

[54] TRICKLE IRRIGATION SYSTEM
[76] Inventor: Lloyd Spencer, 220 Patrician Way, Pasadena, Calif. 91105
[22] Filed: July 21, 1972
[21] Appl. No.: 274,078

[52] U.S. Cl............... 239/542, 138/45, 239/107, 239/547
[51] Int. Cl............................................. B05b 15/02
[58] Field of Search.................... 239/106, 107, 108, 239/109, 110, 111, 542, 547, 569, 570; 138/44, 45, 46

[56] References Cited
UNITED STATES PATENTS

| | | | |
|---|---|---|---|
| 3,685,735 | 8/1972 | Foster | 239/109 |
| 3,606,167 | 9/1971 | Chapin | 239/547 X |
| 3,268,172 | 8/1966 | Goyette | 239/109 |
| 3,693,888 | 9/1972 | Rondos et al. | 239/547 X |
| 3,567,134 | 3/1971 | Smith | 239/547 |

Primary Examiner—M. Henson Wood, Jr.
Assistant Examiner—Michael Mar

[57] ABSTRACT

A trickle irrigation system which utilizes a series of irrigating valves and interconnecting tube valves, the irrigating valves assuming open, flushing conditions at pressures below a critical zone, and assuming a restricted or trickle condition at pressures above the critical zone; whereas the tube valves assume a constructed flow or closed condition below the critical pressure zone and expand to full flow condition at pressures above the critical zone. As a consequence, on supplying water to the irrigation system, the irrigating valves first flush then automatically restrict to trickle condition in sequence as the tube valves open in sequence. When the water is shut off a second flushing action occurs before drainage is complete.

18 Claims, 48 Drawing Figures

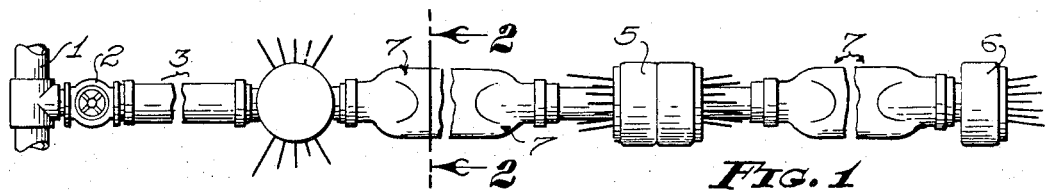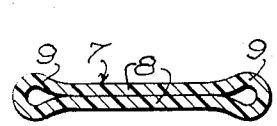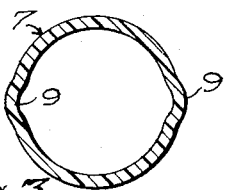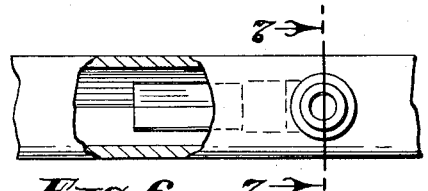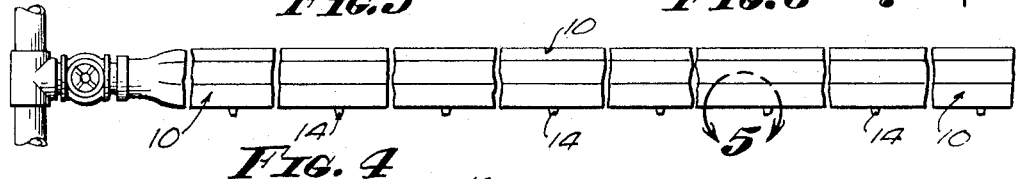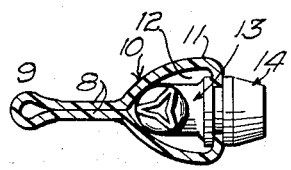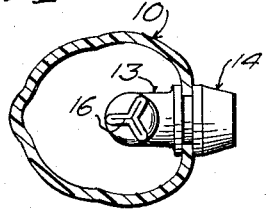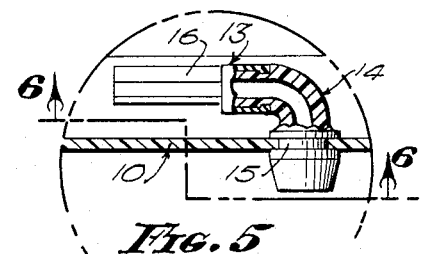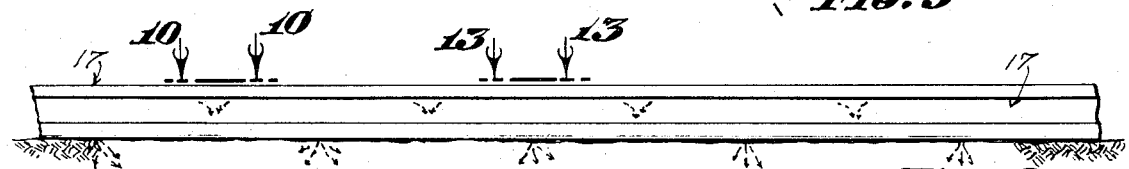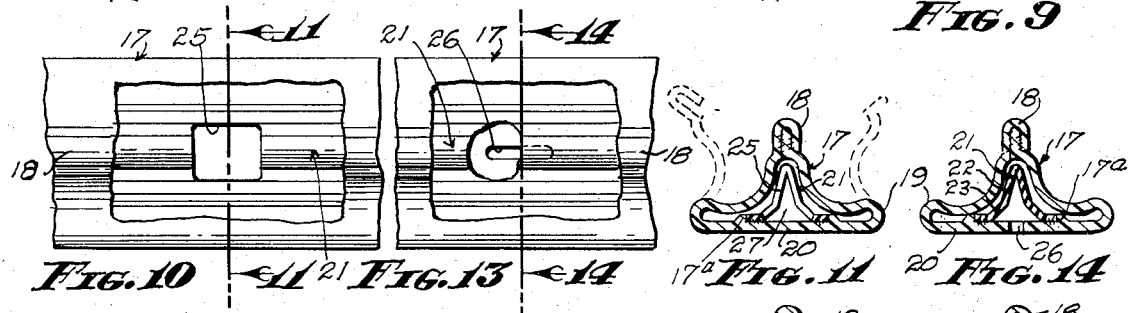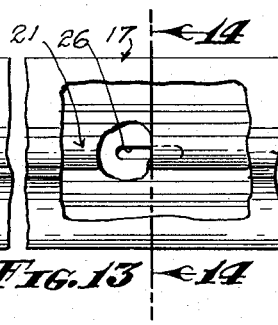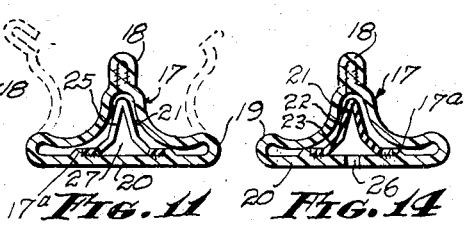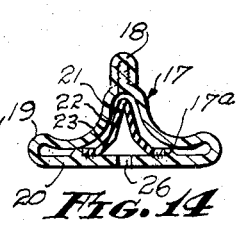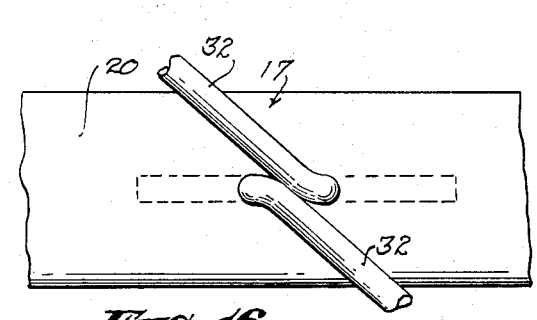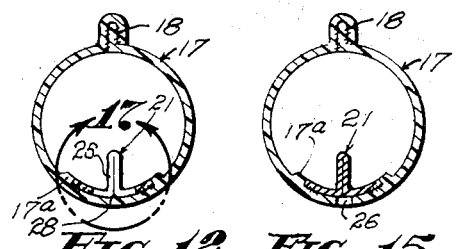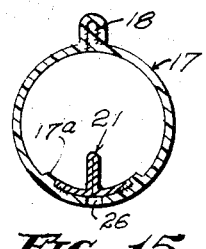

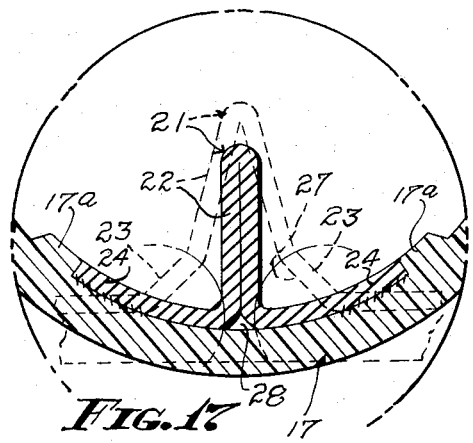
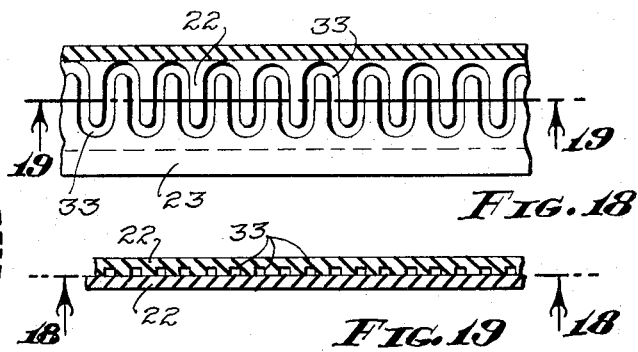
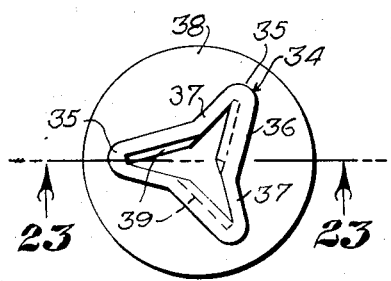
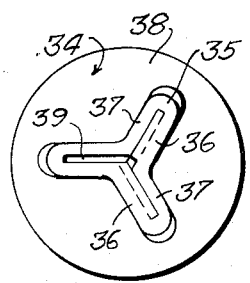
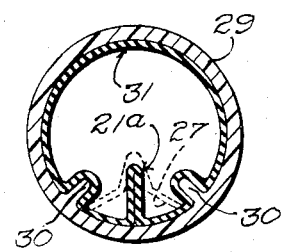
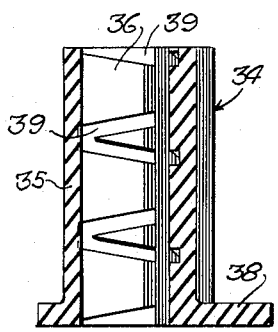
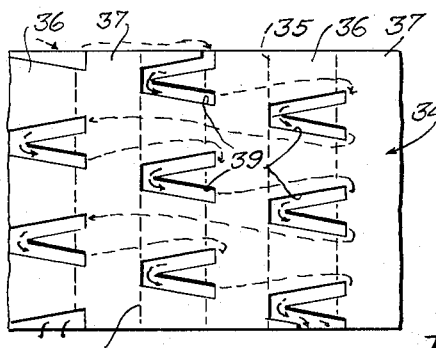
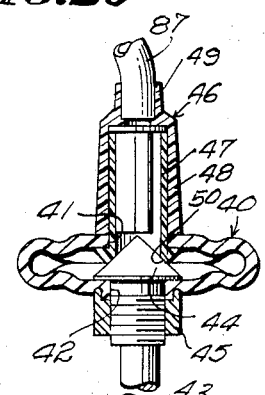
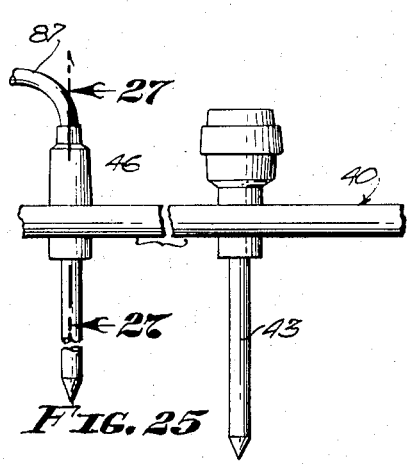
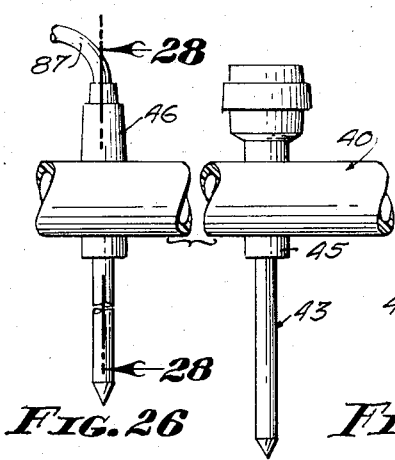
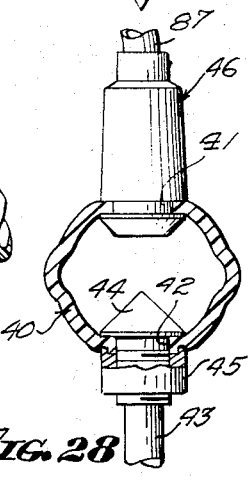

PATENTED DEC 18 1973 3,779,468
SHEET 3 OF 3
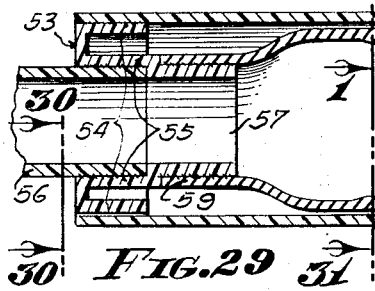
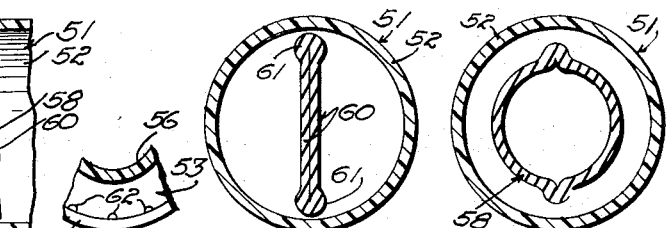
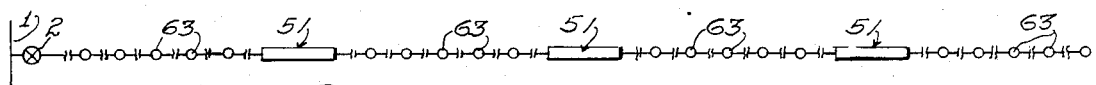
FIG.29  FIG.30  FIG.31  FIG.32
FIG.33
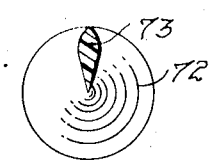 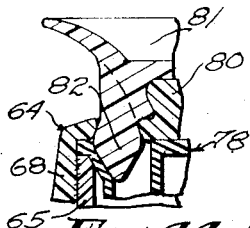 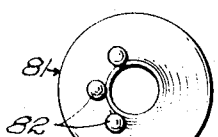
FIG.35  FIG.44  FIG.45
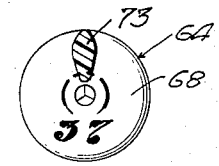   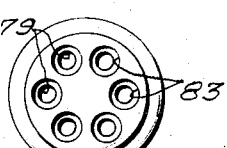
FIG.36  FIG.40  FIG.42  FIG.46

FIG.48
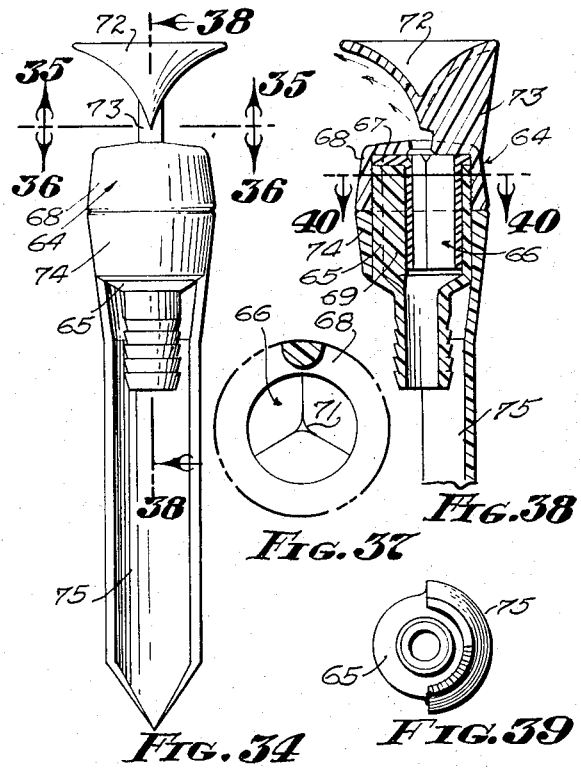
FIG.34  FIG.37  FIG.38  FIG.39
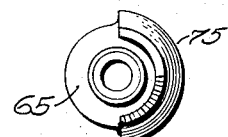 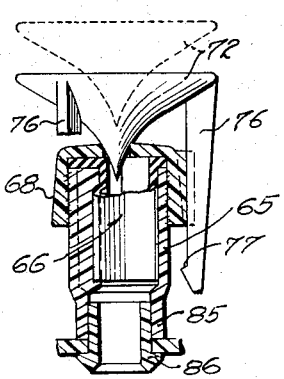
FIG.41  FIG.47

TRICKLE IRRIGATION SYSTEM

Various embodiments of the irrigating valves and tube valves are adapted to meet different conditions of use.

BACKGROUND OF THE INVENTION

This invention is a further development of a drip or trickle irrigation system utilizing the self-flushing irrigating valve disclosed in my preceding and copending application Ser. No. 245,312, filed Apr. 19, 1972. As has been set forth in detail in the previous application, drip or trickle irrigation offers many advantages, but also many disadvantages, including one extremely serious disadvantage; namely, the problem of closure by particulate matter of the irrigation outlets. These outlets are extremely small, only a few thousanths of an inch in diameter and require that the water be highly filtered at great expense and supplied at extremely low pressures which materially limit the range of use. This is overcome to a limited extent by providing long outlet passages of slightly larger size. It has been found necessary to make such passages accessible to periodic cleaning involving considerable labor cost.

Another approach has been by use of a flushing means which is periodically operable. My copending application and the present application are directed to this approach, and incorporate substantial improvements over previous self-flushing irrigation systems. For example, a flushing cycle requires from ten to twenty times the water required for normal drip or tickle irrigation; but heretofore self-flushing systems have required an excess irrigation capacity to accomplish this operation which is only needed for a few seconds when the system is being turned on or off.

Also, while self-flushing trickle irrigation systems have demonstrated substantial savings in water with increased crop output and have permitted use of water more chemically laden than other irrigation water and in general has proven superior to previous non-flushing systems, still the cost of installation and maintenance and the problems of interference with cultivation, plant treatment and harvesting have been substantial. This has had the effect of materially limiting the areas of use of trickle irrigation.

SUMMARY OF THE INVENTION

The present invention is directed to a trickle irrigation system which overcomes the problems noted and is summarized in the following objects:

First, to provide a trickle irrigation system wherein self-flushing irrigation valves are interposed between tube valves whereby, when the irrigation system is shut off, or the pressure therein is below a critical range, the irrigating valves occupy an open or flushing position, and the tube valves occupy a closed, or minimal area position; then as the water pressure is applied to the system, the critical pressure range progresses through the system as the irrigation valves assume their restricted or trickle condition in sequence and the tube valves open to their full flow condition in sequence.

Second, to provide a trickle irrigation system, an embodiment of which utilizes a short length of a novelly constructed tube valve interposed between groups of self-flushing valves, the tube valve being capable, if desired, for use as an anti-siphoning valve.

Third, to provide embodiments of the trickle irrigation system wherein the self-flushing irrigation valves are connected by tube valves in the form of tubing molded or extruded in a flat form condition to form, normally, minimum volume areas, but capable, when subjected to a predetermined internal pressure, to expand into essentiallly circular form, whereby, during trickle operation of the irrigating valve full line capacity is achieved.

Fourth, to provide an embodiment of the trickle irrigation system wherein the self-flushing valves are disposed in spaced relation within a continuous tube valve, each self-flushing valve having a side outlet, the tube valve having normally a flattened shape, but including a protective tubular chamber about the self-flushing valves.

Fifth, to provide an embodiment of the trickle irrigation system wherein the irrigating valves are formed by a continuous folded inner tube forming, under flush conditions, a hollow rib within the tube valve, the rib being collapible under trickle conditions and having spaced inlets and the covering wall of the surrounding tube valve having spaced outlets.

Sixth, to provide a trickle irrigation system, as indicated in the preceding object, wherein the outer tube may be rigid and the irrigating valve may be included in a complete tubular member slidably received as a liner in the outer tube.

Seventh, to provide an embodiment of the trickle irrigation system wherein a continuous collapsible tube forms the tube valve, the irrigating valves project outwardly therefrom and are opposed by anchoring stakes extending laterally from the tube valve, the inner ends of the irrigating valves and stakes being mutually engagable upon collapse of the tube valve to form anti-siphon valves.

Eighth, to provide components of the trickle irrigation system which may be combined and interchanged to convert the self-flushing valve to various types of water discharging patterns and to meet conditions imposed by various types of plants.

Ninth, to provide a trickle irrigation system, a novelly arranged self-flushing valve means which incorporates a labyrinth passage between entrance and exit for control of water under drip or trickle condition, above critical pressure, but which enlarges to effect cross connection between elements of the labyrinth passage under flush conditions; that is, below trickle pressure.

DESCRIPTION OF THE DRAWINGS

FIG. 1 is a fragmentary, essentially diagrammatical and reduced plan view showing in its idle condition one embodiment of a trickle irrigation system wherein multiple self-flushing valve assemblies of the type shown in my previous application Ser. No. 245,312 are joined together by pressure sequencing tube valves.

FIG. 2 is an enlarged transverse sectional view of a tube valve taken through 2—2 of FIG. 1 and showing the tube valve in its collapsed condition.

FIG. 3 is a similar transverse sectional view of a tube valve shown in its expanded or irrigation flow condition.

FIG. 4 is a fragmentary, essentially diagrammatical and reduced plan view showing in its idle condition another embodiment of the trickle irrigation system wherein a continuous tube valve contains a series of self-flushing valve units.

FIG. 5 is an enlarged fragmentary sectional view thereof taken within circle 5 of FIG. 4 with portions in section.

FIG. 6 is a fragmentary partial side, partial sectional view thereof taken through 6—6 of FIG. 5.

FIG. 7 is a transverse sectional view taken through 7—7 of FIG. 6 showing portions in elevation and showing the tube valve in its collapsed condition.

FIG. 8 is a similar sectional view showing the tube valve in its expanded or irrigation flow condition.

FIG. 9 is a fragmentary, esentially diagrammatical, reduced side view showing in its idle-flushing condition another embodiment of the trickle irrigation system having coextensive outer and inner tube valves, the outer valve forming a supply line and the inner valve a series of self-flushing irrigating valve units.

FIG. 10 is an enlarged fragmentary plan view thereof under idle-flushing condition taken at 10—10 of FIG. 9 above, the inlets of adjacent irrigation valve units with the overlying portion of the outer valve tube broken away.

FIG. 11 is a transverse sectional view thereof taken through 11—11 of FIG. 10 showing an outer tube in its idle condition and an inlet end of an irrigation valve tube in its flushing condition.

FIG. 12 is a corresponding transverse sectional view thereof showing the outer tube in full flow condition and the inlet end of an irrigation valve tube in its trickle flow condition.

FIG. 13 is an enlarged fragmentary plan view thereof under idle-flushing condition taken at 13—13 of FIG. 9 above outlets of adjacent irrigating valve units with an overlying portion of the outer valve tube broken away.

FIG. 14 is a transverse sectional view thereof taken through 14—14 of FIG. 13 showing an outer tube in its idle condition and the outlet end of an irrigation valve tube in its flushing condition and registering with a discharge opening piercing the outer tube.

FIG. 15 is a corresponding transverse sectional view thereof showing the outer tube in full flow condition and the outlet end of an irrigation valve tube in its trickle flow condition for outlet through the discharge opening.

FIG. 16 is a fragmentary bottom view of the trickle irrigation system shown in FIG. 9 wherein a pair of distributor tubes are inserted in the discharge openings.

FIG. 17 is a further enlarged sectional view taken through circle 17 of FIG. 12 but taken between the inlet and outlet of an irrigation valve tube to illustrate by solid lines the trickle flow condition and by broken lines the flush flow condition of an irrigation valve unit.

FIG. 18 is a fragmentary sectional view taken along 18—18 of FIG. 19 illustrating a modified form of the self-flushing irrigating valve tube in trickle condition wherein opposed walls are in mutual contact, one wall being provided with a labyrinth passage to effect increased pressure drop between the inlet and outlet ends of an irrigating valve unit.

FIG. 19 is a fragmentary sectional view taken along 19—19 of FIG. 18.

FIG. 20 is a transverse sectional view showing a further embodiment of the trickle irrigation system related to the construction shown in FIGS. 9 through 16 and corresponding to FIG. 12 thereof.

FIG. 21 is an end view of a self-flushing irrigating valve unit of a type shown in the copending application in which is incorporated a labyrinth passage, the valve being shown in its self-flushing condition.

FIG. 22 is a similar end view thereof showing the valve unit in its trickle flow condition.

FIG. 23 is a longitudinal sectional view taken thereof through 23—23 of FIG. 21 showing portions of the labyrinth passage.

FIG. 24 is a developed view showing the interior wall of the irrigating valve indicating the relationship between portions of the labyrinth passage.

FIG. 25 is a fragmentary, essentially diagrammatical reduced side view showing in its idle or flushing condition a further embodiment of the trickle irrigation system wherein self-flushing valve units project upwardly in spaced relation from a tube valve, each opposed by a ground stake and sealingly engagable therewith when the irrigation system is idle.

FIG. 26 is a fragmentary side view thereof showing the system in trickle flow condition.

FIG. 27 is an enlarged transverse sectional view thereof with portions in elevation taken through 27—27 of FIG. 25.

FIG. 28 is an enlarged transverse sectional view thereof with portions in elevation, taken through 28—28 of FIG. 26.

FIG. 29 is a fragmentary longitudinal sectional view of an embodiment of the valve tube shown in its closed position.

FIG. 30 is a fragmentary transverse sectional view thereof taken through 30—30 of FIG. 29.

FIG. 31 is a transverse sectional view thereof taken through 31—31 of FIG. 29, showing the valve in its closed position.

FIG. 32 is a sectional view similar to FIG. 31, showing the valve in its open position.

FIG. 33 is a fragmentary, essentially diagrammatical reduced top view showing a further embodiment of the trickle irrigation system utilizing the tube valve shown in FIGS. 29 through 32.

FIG. 34 is a side view of an embodiment of the self-flushing irrigation valve adapted to produce a spray discharge.

FIGS. 35 and 36 are transverse sectional views thereof taken through 35—35 and 36—36 of FIG. 34.

FIG. 37 is an enlarged fragmentary view taken within circle 37 of FIG. 36, showing the valve in its trickle condition.

FIG. 38 is a fragmentary longitudinal view thereof taken through 38—38 of FIG. 34.

FIG. 39 is a bottom end view thereof.

FIG. 40 is a transverse sectional view thereof taken through 40—40 of FIG. 38.

FIG. 41 is a fragmentary longitudinal view with portions in section corresponding to FIG. 38 showing a modified form of the spray discharge self-flushing valve wherein the spraying means occupies a sealing position when the valve is idle.

FIG. 42 is a fragmentary longitudinal view with portions in section also corresponding to FIG. 38 showing a further modified form of the spray discharge self-flushing valve wherein a ring of self-flushing valve elements are provided, and shown in their flushing condition.

FIG. 44 is an enlarged fragmentary sectional view taken within circle 44 of FIG. 42 showing a modified form of the spray head arranged to provide shut-off of selected outlets.

FIG. 45 is a bottom view of the spray head showing several shut-off plugs.

FIG. 46 is a plan view of the valve body cap with the spray head removed.

FIG. 47 is a side view of a modified valve body cap arranged to receive a plurality of drip tube extensions.

FIG. 48 is a top view thereof.

Figure 43:
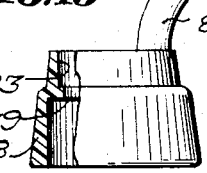
FIG. 43 is a bottom view of the self-flushing valves of FIG. 42 in their flushing condition with the housing thereof taken through 43—43 of FIG. 42.

Reference is first directed to FIGS. 1 through 3, which illustrate one embodiment of the trickle irrigation system including a feeder line 1, having a series of control valves 2 connected to suitable metal or plastic pipe or tubing 3. Indicated diagrammatically are representative multiple outlet self-flushing irrigating manifold valves 4, 5 and 6 more fully disclosed and described in my copending application Ser. No. 245,312. Series connected between the manifold valves are tube valves 7. These are formed of plastic material which may be fiber reinforced. Normally the tube valve includes flat portions 8 essentially in mutual contact and small marginal loops 9 to minimize stress concentration.

Operation is as follows:

As described in the previous application, each of the self-flushing valves normally, that is, below a predetermined pressure range, are in an open or flushing condition. An optimum opening is in the order of an 8 inch circle or about 0.01 square inches. Above this pressure range the self-flushing valve collapses to a trickle condition in which the area is about 1/10th to 1/20th area. Thus, during low pressure or flushing conditions the water demand is ten to 20 times the demand under trickle condition.

The presence of the valve tubes 7 downstream of each group or set of flushing valves permits a relatively low volume flow of water to raise in pressure sufficiently to trigger the self-flushing valves to their trickle condition, thus reducing the demand so that the raised water pressure can expand the succeeding tube valve to flow condition for ample supply of flushing water to the next set or group of self-flushing valves. On shut-off, the residual water produces a second flushing action as the pressure falls below the critical pressure. As a consequence, the number of self-flushing valves on a line may be increased ten or twenty times or in proportion to whatever ratio exists between the trickle flow condition and the flush flow condition.

Reference is now directed to FIGS. 4 through 8. In this case a special valve tube 10 is utilized. Like the valve tube 7 it is extruded from plastic material which may contain fiber reinforcing. Its shape, however, differs in that it includes in addition to the flat portions 8 and a marginal loop 9 and enlarged loop 11 which may be essentially triangular and which forms a valve encasing chamber 12.

The chamber 12 receives a series of self-flushing irrigating valves 13. Each valve includes an elbow fitting 14 having a groove 15 bordered by flanges so as to be forced through an opening formed in the chamber 12 and, if desired, cemented in place. The openings into the chamber 12 may be formed by a conventional piercing-punching tool. The remaining end of the elbow fitting 14 receives a self-flushing valve element 15 which may be essentially as shown in the copending application. The discharge end of the fitting 14 may be counterbored or otherwise formed to receive an extension tube, not shown.

The embodiment shown in FIGS. 4 through 8 functions essentially as previously described in that the irrigation valves flush then trickle in sequence as the water supply progresses down the expanding tube valve. As in the previous embodiments, on shut-off, the reverse occurs causing a second flushing action, and the tube valve collapses around the irrigating valve and serves as a protection.

Reference is now directed to FIGS. 9 through 19 which illustrate a further embodiment of the trickle irrigation system. This construction includes a continuous tube valve 17 which may be press formed from plastic strip stock or extruded to have, initially, a generally U-shaped open cross section as suggested by broken lines in FIG. 1. The margins are shaped so that they may be joined together by conventional means to form a sealed apex 18 of a normally triangular figure having marginal loops 19, connected by a flat bottom portion 20.

Before closing the strip stock to form the tube valve 17, a continuous multiple self-flushing valve 21 is formed therein, and incorporates a portion of the wall thereof. The valve 21 is formed in part of an elastomeric plastic strip stock or is extruded to form an inverted V-shape, the walls of which include an acutely folded apex joining acutely related outer wall portions 22 and obtuse side creases joining the wall portions 22 to inner wall portions 23 diverging at a greater angle. The inner wall portions 23 in turn are joined to margins 24 which are fused or otherwise secured to the flat bottom portion 20 of the tube valve 17. To aid in locating the margins 24 for bonding to the tube valve 17, the bottom portion 20 of the tube valve may have alignment ribs 17a.

The walls of the tube valve 17 between the margins 24 of the self-flushing valve 21 is provided with a row of outlet openings 25. Midway between the openings 25, inlet openings 26 are formed in the wall portions 23 and 24 of the self-flushing valve 21. When the system is idle or at flushing pressure, the walls of the self-flushing valve 21 define a triangular flushing passage 27 as shown in FIGS. 11, 14 and 17. Above a predetermined triggering pressure externally of the valve 21, the valve walls collapse to a trickle condition forming a small trickle passage 28 as shown best in FIG. 17.

Reference is directed to FIG. 20. If the nature of the irrigation system minimizes the need for a normally collapsed tube valve line, such as heretofore described, or another embodiment of the tube valve as hereinafter described is applicable, a rigid or essentially rigid conduit 29 may be used as shown in FIG. 20. The conduit 29 is provided with a pair of internal ribs 30. The conduit receives as a liner a self-flushing valve sleeve 31 which envelopes the ribs 30 to orient the sleeve relative to the conduit. Formed between the ribs 30 is a self-flushing valve 21a which is the same as the valve 21, except that the bonded margins 24 are omitted.

In this embodiment the conduit 31 and sleeve 32 are extruded and the sleeve subsequently pulled into place determined by appropriate inlet and outlet openings.

As in the other embodiments of the self-flushing valve, the discharge flow rate is dependent upon the physical properties of the material, the effective length of the trickle passage between inlet and outlet, and the desired critical or tripping pressure at which flow is to shift between flush and trickle flow. Softer elastomeric materials tend to form trickle passages of smaller diameter and hence have a lesser flow rate for a given pressure than if harder elastomeric materials are selected. Similarly, the longer the trickle passage, the greater difference between inlet and outlet pressures.

The spacing between outlet openings 25 is selected to correspond to the spacing between plants so that each plant may receive the same quantity of water. In fact, each plant receives water from two inlet openings 26 so that even if one trickle passage should clog during trickle flow, at least half the supply will be delivered to the plant until subsequent flushing occurs.

If the distance between the desired position of the outlet openings 25 is too great for adequate trickle flow, it is merely necessary to form the inlet openings 26 at appropriate distances leaving unused portions which do no harm. In some instances it may be desired to have the final outlet extended from the outlet openings 25 or to provide a pair of such final outlets. This may be done by inserting one or two tubes 32 of appropriate size for an opening 25 so as to extend into the flush passages at each side.

Reference is now directed to FIGS. 18 and 19. Under some conditions it may be desirable to use materials which do not form sufficiently small trickle passages, or the distances between inlet and outlet of the self-flushing valve are too short, or the required operating pressures are too low, or for other reason the effect of labyrinth passages are desirable. such passages may be provided while retaining the advantages of flush flow. For example, this may be attained by increasing the wall thickness, preferably of one of the wall portions 22 and molding or pressing a labyrinth channel 33 therein, such as a zig-zag channel, suitably open at the inlet and outlet openings 26 and 25. The opposite wall 22 may be flat so as to close the channel under trickle condition to form a passage. The channel 33 may be much larger than the trickle passage 28 yet have the same or lesser flow properties. Under flush flow, any particulate matter obstructing the passage is readily washed out. Flow will occur through he trickle passage 28, but this can be minimized or even eliminated by providing superficial ribs, not shown, dimensioned and located to fit the trickle passage.

Reference is now directed to FIGS. 21 through 24 which illustrate a self-flushing irrigating valve 34, the valve in its normal or flush condition as shown in FIGS. 21 and 23 is in the form of a triangular tube having three acute corners 35. The corners are connected by side portions 36 and 37 disposed in obtuse relation. The tubular valve is joined to an end flange 38, or several may be joined to a common base. Under trickle condition the side portions 36 and 37 of adjacent sides are pressed together as shown in FIG. 22 by external pressure. The construction thus far described is essentially the same as an embodiment shown in my copending application.

In the present structure, each side portion 36 has a greater wall thickness than the side portion 34 and is provided with a series of channels 39 arranged in converging and intersecting pairs. The distribution of the channels are such that, when the valve assumes its collapsed or trickle condition as shown in FIG. 22, the channels are covered by the side portions 37 and are connected to form a zig-zag labyrinth passage between the ends of the tubular valve. Not only is the effective trickle path lengthened in this manner, but the sharp turns at the junctures between channels create turbulent zones which materially increases the resistance to water flow. In flush flow condition as indicated n FIG. 21 the channels 39 are exposed for cleaning.

Reference is now directed to FIGS. 25 through 28. For some purposes it is desirable to fix the irrigation line along a margin of narrow plant growing areas, for example, nursery benches where the plants are in flats, cans or pots; or landscape borders where the plants are potted or planted in the ground. An embodiment, particularly suited for this purpose includes a normally flat tube valve 40 which may be similar to the tube valve 7. At desired locations the tube valve 40 is punched to form opposed pairs of upper and lower openings 41 and 42.

Each lower opening 42 receives a stake 43 having a head 44 and clamp nut 45. Each upper opening 41 may receive various types of irrigating valve assemblies. For purposes of illustration a single valve assembly 46 is shown in section in FIG. 27. The valve assembly includes a housing having an inner sleeve 47 and an outer sleeve 48 having a flange and a mating end for clamping the margins of an upper opening 41. The outer sleeve terminates in perforated cap 49 and the cap and inner sleeve clamp the flanged outer end of a self-flushing valve, such as the valve 24 or a similar valve free of the channels 39, or another self-flushing valve, such as suggested in my copending application.

The inner end of the inner sleeve 47 may form a seat 50 which seals against the head 44 of the stake 43 when the pressure is off as indicated in FIG. 27 and in this respect prevents backflow in the event of suction pressure in the system. Flushing pressure raises the valve 34 to permit flushing flow before the critical or trigger pressure is reached causing expansion of the tube valve as shown in FIGS. 26 and 28 and trickle flow of the valve 34. As later indicated, various other irrigating valve assemblies may be substituted to meet various conditions of use.

To meet some irrigation conditions, it is not advantageous to utilize tube valves of substantial length or to mount or incorporate self-flushing valves in sequence within or on the tube valves. For example, in regard to some orchard irrigation systems, particularly sprinkler irrigation systems having underground supply lines; should it be desirable to convert to, or to alternate use with a trickle irrigation system, as much as possible of the original supply system need be retained. Also in other situations it may be desirable to utilize self-flushing valves either individually or in groups connected by metal pipe or rigid plastic pipe or tubing.

Reference is now directed to FIGS. 39 through 33 which illustrate a tube valve assembly 51 suitable for such use. The assembly includes an outer shell 52, preferably a plastic tube. Molded plastic end fittings 53 having outer flanges 54 are cemented in the ends of the shell 52. The end fittings have radially inner flanges 55 which may be cemented to plastic pipe 56. Extending axially inward from each end fitting is a nipple 57 over which is slipped and cemented or otherwise secured a tube valve 58 having circular ends 59. Intermediate its ends, the tube valve 58 is provided with flat walls 60 normally in mutual engagement throughout their width so that normally the valve is closed or sealed as shown in FIG. 31. The side margins 61 are enlarged or reinforced to take load stress.

While complete seal under closed condition is not essential for operation of the tube valve 58, it may be desirable in some installatins to prevent back flow should suction pressure develop in the supply line upstream and there is no significant buildup of pressure downstream of the valve; that is, the tube valve 58 may function as an anti-siphon valve.

The optimum length for the tube valve assembly 51 is in the order of one foot. The length is determined by the properties of the elastomeric material comprising the tube valve 58. It is desirable that the force required to effect expansion be capable of creating a triggering pressure for the upstream location self-flushing valves; however, dependent on the number of such valves between tube valves and flow line size, pressure rise to trigger pressure condition may be distributed between several of the tube valves 58, as is the case between succeeding portions of the previously described elongated tube valves.

It is, of course, essential that the tube valve 58 be relatively free to expand. If the shell 52 is sealed, a moderate increase in air pressure will occur as the tube valve 58 expands and thus moderately decrease maximum flow, but the overall size could be increased to compensate. Also bleeder ports 62 may be provided; however, if the tube valve assembly 51 was intended to be buried, entrance of water would pose a problem. If the tube valve is not to be buried, the shell 52 could be omitted unless rigidity between its ends due to coupling with rigid pipe is desired.

The tube valve assembly 51 is adaptable for use with any self-flushing irrigating valve adapted for connection to a rigid conduit, including those shown in my copending application, as well as those shown herein whether arranged as single valves or arranged in groups. Collectively these valves are indicated diagrammatically in FIG. 33 and designated 63.

It has been found that the type of self-flushing valve shown in FIGS. 21 and 22, but free of the channels 39, can be caused, under trickle condition, to produce a samll jet stream, if no side forces are produced to bend or distort the valve. This is easily accomplished by use of the harder elastomeric materials, synthetic rubber, or rubber compositions. Also, for such purpose greater flow is desired than is desired for true trickle flow or drip flow. By placing a deflector over the jet stream a low volume sprinkler or spray device is produced which may be interchanged or intermingled with the previously described self-flushing irrigating valves used in the trickle irrigation system. As is well known, conventional low volume sprinklers or sprayers because of their necessarily small openings have required frequent servicing which is eliminated by adapting the self-flushing irrigating valve to this purpose.

Reference is now directed to FIGS. 34 through 40, which illustrate a self-flushing trickle spray valve 64. The valve includes a valve housing 65 the lower end of which is shown as reduced and forms a fitting 65 ribbed to fit a small plastic hose. The fitting may be modified for other mounting arrangements, as will be described hereinafter. The housing body 65 receives a self-flushing irrigating valve 66 which may be the same as valve 34 with the channels omitted, or may correspond to the valve 46. In fact, the valve 66 may be an adaptation of other such valves shown in my copending application. The valve 66 includes a flanged upper end 67 clamped between the housing 65 and a cap 68 cemented in place. The housing may have internal ribs 69 to hold the valve in place.

The cap 68 is provided with a central aperture 70 which aligns with a trickle passage 71 formed when the valve is constricted to trickle flow as shown best in FIG. 37. A deflector of any suitable shape may be mounted over the aperture 70. For example, the deflector may be in the form of a cone 72 having concave sides and integrally attached to the cap 68 by webs 73. The trickle spray valve 64 may be supported by a ring 74 joined to a stake 75 spaced from the fitting 65 to receive the hose, not shown.

Alternatively as shown in FIG. 41, the cone may have webs 76 guided in grooves formed vertically in the sides of the cap 68 and having stops 77. In this construction the cone raises when in use and closes the aperture 70 when not in use.

Reference is now directed to FIGS. 42 through 46. In place of a single self-flushing valve as in FIGS. 34 through 41, a group or set of self-flushing valves 78 may be used and be smaller in size to fit in the same housing 65. For example, such valves may be arranged in a ring and the cap 68 may be provided with six apertures 79. In this case, the cap may be provided with a central boss 80 over which snaps a conical deflector 81. A set of deflectors may be provided with one or more plugs 82 positioned to fit corresponding apertures to change the arc of distribution of the sprinkler.

Reference is now directed to FIGS. 47 and 48. The cap 68 may be provided with counterbores or sockets 83 extending from the apertures 79 to receive several tubes 84 for trickle irrigation use.

Reference again is made to FIG. 41; the lower end of the housing 65 has been modifed in this view to form a short sleeve 85 corresponding to the sleeve 48 of the construction shown in FIG. 27. The sleeve 85 receives a flanged inner sleeve 86 so the valve tube 40 or its equivalent may be clamped at an opening 41. By modifying only the housing 65, all of the self-flushing irrigation embodiments shown in FIGS. 34 through 48 may be adapted to the system shown in FIGS. 25 through 28. For purposes of illustration, one adaption, designated 87, is shown therein.

Certain embodiments of the trickle irrigation system are, for example, those utilizing the tube valves 10 and 17 and longitudinally extending irrigating valves encased therein, particularly suitable for row crops. The valve tubes 10 and 17, functioning also as supply lines with the irrigating valves therein may, prior to or between use be stored on drums or reels and readily unreeled therefrom along the crop line prior to planting and as readily re-reeled thereon after harvest or in preparation for replanting, with minimum interference with cultivation, otherwise attending to the crop or harvesting.

The length of the supply line-tube valve as well as the number and spacing of the irrigating valves therein, is determined by the desired length of crop row and the spacing of the plants. By reason of the sequential triggering of the irrigating valves from flush to trickle condition the number of valves that may be series connected with essentially constant trickle output is substantial; in fact, there may be several hundred or even several thousand valves if desired, depending only on the size of the supply line-tube valve.

A feature of the irrigating valve which has substantial importance should be noted. As indicated in my copending application, when the irrigation valve is in trickle condition it functions as a constant flow valve. As a result change in level of the crop area has minimal effect on the trickle output at any irrigating valve. More specifically, once past the triggering pressure and under trickle condition, the trickle rate remains substantially constant even to pressure levels above conventional irrigation pressures, (in the order of 90 psi) and also at pressure levels close to the triggering pressure. In fact, the term "triggering pressure" is used for, whether the pressure is rising or dropping, the change from flush to trickle condition, or trickle to flush condition takes place suddenly.

The foregoing description of the various embodiments of the trickle irrigation system illustrate the wide range of its adaption to many types of agricultural crops, such as those grown on trees, large or small bushes, as well as row crops and even vegetables and other plants which are replanted yearly. Also the trickle irrigation system is adapted to landscaping use, in parks and around public and private buildings as well as in nurseries both at the seeding level and retail outlets, whether the plants be planted in containers such as flats, pots or bowls or in the ground. Furthermore, the simplicity of the system lends itself for supply to and use by amature gardners.

While particular embodiments of this invention have been shown and described, it it not intended to limit the same to the details of the constructions set forth, but instead, the invention embraces such changes, modifications and equivalents of the various parts and their relationships as come within the purview of the appended claims.

I claim:

1. A trickle irrigation system, comprising:
   a. an irrigation line;
   b. a self-flushing irrigating valve forming an outlet from the irrigation line, the irrigation valve being biased toward an open flush flow condition and yieldable to a triggering pressure to collapse to a trickle flow condition;
   c. and a control valve forming a link in the irrigation line downstream of the irrigating valve, the control valve being biased toward an essentially closed position below the triggering pressure to permit increase of pressure at the irrigating valve until triggering pressure is attained, the control valve being movable above the triggering pressure to open the irrigation line for flow past and downstream of the irrigating valve.

2. A trickle irrigation system as defined in claim 1, wherein:
   a. a series of control valves form collectively a common elongated tube incorporating the irrigation line, the control valve tube has a collapsed closed position and an expanded open position the control valves being operable in sequence;
   b. and a plurality of irrigating valves are disposed in spaced relation along the control valve tube, have outlets therefrom, and are operable in sequence.

3. A trickle irrigation system as defined in claim 2, wherein:
   a. the control valve tube, when collapsed, forms a protective chamber encasing the irrigating valves.

4. A trickle irrigation system as defined in claim 1, wherein:
   a. a series of control valves form, collectively, a common elongated tube incoroporating the irrigation line, the control valve tube having a flattened closed position and a circular open position;
   b. a plurality of irrigating valves project from one flat side of the control valve tube;
   c. and supporting means for the irrigating valves extend from the opposite flat side of the control valve tube.

5. A trickle irrigation system as defined in claim 1, wherein:
   a. a series of control valves form, collectively, a common elongated outer tube incorporating the irrigation line, biased to a collapsed closed position and expandable to an open position, the control valves being operable in sequence;
   b. an elongated inner tube forms a series of irrigating valves within the outer tube, the inner tube being biased to an expanded condition to form a flush flow condition below the triggering pressure and collapsible above the triggering pressure to form trickle passages, there being openings in the inner tube and outer tube to form inlets and outlets for the irrigating valves.

6. A trickle irrigation system as defined in claim 5, wherein:
   a. the inner tube includes a pair of wall portions in folded confronting relation and in mutual contact when the inner tube is in trickle condition, and in diverging relation when the inner tube is in flush flow condition;
   b. and the trickle passage is a labyrinth passage formed by the confronting surfaces of the wall portions.

7. A trickle irrigation system as defined in claim 1, wherein:
   a. a series of control valves are incorporated as links in the irrigation line, each control valve including a normally flat tube forming a flow barrier until the pressure upstream rises to a irrigating valve triggering pressure.

8. A trickle irrigation system as defined in claim 7, wherein:
   a. sets of irrigating valves are disposed between the control valves.

9. A trickle irrigation system as defined in claim 1, wherein:
   a. the self-flushing irrigating valve is tubular and includes pairs of fold connected walls in confronting relation, each pair occupying a diverging relation when the valve is in flush flow condition and occupying a mutually engaging relation when subject to triggering pressure, the pairs of walls having other folded connections forming collectively the trickle passage.

10. A trickle irrigation system as defined in claim 1, wherein:
    a. the self-flushing irrigating valve is tubular and includes pairs of fold connected walls in confronting relation, each pair occupying a diverging relation when the valve is in flush flow condition and occupying a mutually engaging relation when subject to triggering pressure, the pairs of walls defining therebetween a labyrinth passage communicating between the ends of the valve and forming the trickle passage.

11. An irrigation valve for trickle irrigation systems, comprising:
    a. a housing having an entrance end and an exit end for flow of water therethrough;
    b. a least one tubular irrigation valve member mounted longitudinally therein in alignment with the exit end, the valve member being formed of elastomeric material and being biased to resist external pressures below a predetermined triggering pressure applied externally of the valve member for form a flush passage in alignment with the exit end of the housing, and yieldable to added external pressure to form a trickle pasage having a jet discharge end in alignment with the exit end of the housing;
    c. and a flow deflector beyond the entrance end of the housing for engagement by a jet stream discharging from the trickle passage.

12. An irrigation valve as defined in claim 11, wherein:
    a. the flow deflector is conical having an apex aligned with the jet stream;
    b. and guide means connect the deflector with the housing for axial movement between an open position and a position closing the exit end of the housing.

13. An irrigation valve as defined in claim 11, wherein:
    a. a plurality of valve members are arranged in a ring;
    b. and the housing has a ring of exits in alignment with their respective valve members.

14. An irrigation valve as defined in claim 13, wherein:
    a. the deflector includes plug elements for closing selected exits.

15. An irrigation valve for trickle irrigation systems, comprising:
    a. a housing having an entrance end and an exit end for flow of water therethrough;
    b. at least one tubular irrigation valve member mounted longitudinally therein, the valve member being biased to resist external pressures below a predetermined triggering pressure applied externally of the valve member to form a flush passage communicating between the entrance and exit ends of the housing; the valve member including at least a pair of confronting mutually engageable walls formed of elastomeric material, the walls when in mutual engagement, defining therebetween a labyrinth passage communicating between the entrance and exit ends of the housing.

16. A self-flushing trickle irrigating valve, comprising:
    a. a tubular means having an inlet and an exit end and including a region therebetween externally exposed to pressure at the inlet end;
    b. said region including at least a pair of foldably connected walls movable, in response to the external pressure, between an angularly related condition permitting flush flow of water between the inlet and exit ends, and a mutually contacting condition;
    c. and the wall pair, when in mutually contacting condition, defining therebetween a labyrinth passage between the inlet and outlet for trickle flow of water therebetween.

17. An irrigation line for trickle irrigation systems, comprising:
    a. a tubular member;
    b. a flexible membrane joined at its lateral margins to the inner surface of the tubular member to define with a confronting segment of the tubular member an axially extending flow passage;
    c. inlet openings provide in the membrane in spaced axial relation;
    d. outlet openings provided in the confronting segment of the tube member in axially spaced relation to the inlet openings;
    e. the flexible membrane including marginal wall portions biased to diverge from the confronting segment of the tubing member, whereby, when the tubular member is subjected to water pressure below a predetermined value, the membrane and confronting segment form longitudinal water flushing passages between the inlet and outlet openings;
    f. the flexible membrane being deflectable by water pressure above said predetermined pressure into engagement with the confronting segment;
    g. and means forming reduced trickle flow passages between the inlet and outlet openings upon deflection of the membrane into engagement with the confronting segment.

18. A trickle irrigation line as defined in claim 17, wherein:
    a. the flexible membrane further includes a pair of foldably connected central wall portions and foldable junctures joining the central wall portions to the marginal wall portions;
    b. the marginal wall portions being foldable against the confronting segment, and the central wall portions being foldable into mutual engagement; thereby to cause the junctures to form trickle passage with the opposting portion of the confronting segment.

* * * * *